(12) United States Patent
Iwata et al.

(10) Patent No.: US 7,554,910 B2
(45) Date of Patent: Jun. 30, 2009

(54) METHOD AND AN APPARATUS FOR MANAGING ACCESS PATH

(75) Inventors: Morihiro Iwata, Tama (JP); Nobuo Beniyama, Yokohama (JP); Kenichi Endo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 555 days.

(21) Appl. No.: 11/153,474

(22) Filed: Jun. 16, 2005

(65) Prior Publication Data
US 2006/0215552 A1    Sep. 28, 2006

(30) Foreign Application Priority Data
Mar. 25, 2005 (JP) ............................. 2005-087895

(51) Int. Cl.
*H04L 12/26* (2006.01)
(52) U.S. Cl. ................... 370/231; 370/242; 709/224; 709/238
(58) Field of Classification Search ................. 370/231, 370/232, 234, 242, 244, 248; 709/223, 224, 709/238, 239
See application file for complete search history.

(56) References Cited

U.S. PATENT DOCUMENTS
7,275,103 B1 * 9/2007 Thrasher et al. ............. 709/224

FOREIGN PATENT DOCUMENTS
JP    2000-330924    11/2000
JP    2005-10956    1/2005

* cited by examiner

*Primary Examiner*—Chirag G Shah
*Assistant Examiner*—Otis L Thompson, Jr.
(74) *Attorney, Agent, or Firm*—Antonelli, Terry, Stout & Kraus, LLP.

(57) ABSTRACT

The present invention grasps in advance a portion in which traffic is concentrated and which may become a bottleneck and simplifies management of an access path. In a storage network system that forms multiple paths between a large-capacity data storage device and a host computer that employs the data storage device, and transfers data by means of a selected path, access paths are managed by a management server. The management server selects a second access path that can be used as a replacement of a first access path that connects the data storage device with the host computer, and calculates the quantity of traffic on the first access path which is associated with a device disposed on the first access path. Also, the management server calculates a variation of the quantity of traffic on the second access path which is associated with a device disposed on the second access path taking the calculated quantity of traffic into consideration. Then, the management server determines whether the device on the second access path causes a bottleneck or not, according to the calculated value of the variation of traffic on the second access path. The management server 11 transfers the determined result to the outside, for example, a display device, and notifies a manager of the determined result.

14 Claims, 15 Drawing Sheets

| DEVICE IDENTIFIER | DEVICE TYPE | PORT IDENTIFIER | TRAFFIC VARIATION |
|---|---|---|---|
| CHA1 | CHA | CPORT1 | −80 |
| CHA2 | CHA | CPORT4 | 80 |
| HBA1 | HBA | HPORT1 | −80 |
| HBA2 | HBA | HPORT2 | 80 |
| SWT1 | SWITCH | SPORT1 | −80 |
| SWT1 | SWITCH | SPORT3 | −80 |
| SWT2 | SWITCH | SPORT6 | 80 |
| SWT2 | SWITCH | SPORT10 | 80 |

| DEVICE IDENTIFIER (501) | DEVICE TYPE (502) | PORT IDENTIFIER (503) | TRAFFIC QUANTITY (504) |
|---|---|---|---|
| CHA1 | CHA | CPORT1 | 80 |
| CHA2 | CHA | CPORT4 | 60 |
| HBA1 | HBA | HPORT1 | 240 |
| HBA2 | HBA | HPORT2 | 160 |
| SWT1 | SWITCH | SPORT1 | 240 |
| SWT1 | SWITCH | SPORT3 | 80 |
| SWT2 | SWITCH | SPORT6 | 160 |
| SWT2 | SWITCH | SPORT10 | 60 |

| PATH ID 601 | HOST COMPUTER 602 | VOLUME 603 | AP 604 | CHA PORT 605 | HBA PORT 606 | SWITCH PORT LIST 607 | PRIORITY 608 | TRAFFIC 609 | OPERATING MANAGER 610 |
|---|---|---|---|---|---|---|---|---|---|
| PATH1 | HOST1 | LVOL1 | AP1, AP2 | CHA1, CPORT1 | HBA1, HPORT1 | (SWT1,SPORT1, SWT1,SPORT3) | 1 | 80 | Admin1 |
| PATH2 | HOST1 | LVOL1 | AP1, AP2 | CHA2, CPORT4 | HBA2, HPORT2 | (SWT2,SPORT6, SWT2,SPORT10) | 2 | 0 | Admin1 |
| PATH3 | HOST1 | LVOL2 | AP1,AP2 AP3 | CHA2, CPORT3 | HBA2, HPORT2 | (SWT2,SPORT6, SWT2,SPORT10) | 1 | 160 | Admin2 |
| PATH4 | HOST2 | LVOL1 | AP1, AP2 | CHA2, CPORT4 | HBA3, HPORT3 | (SWT2,SPOR7, SWT2,SPORT10) | 1 | 60 | Admin1 |

| DEVICE IDENTIFIER | DEVICE TYPE | PORT IDENTIFIER | CONNECTION PORT IDENTIFIER |
|---|---|---|---|
| CHA1 | CHA | CPORT1 | SPORT3 |
| CHA2 | CHA | CPORT3 | SPORT9 |
| CHA2 | CHA | CPORT4 | SPORT10 |
| HBA1 | HBA | HPORT1 | SPORT1 |
| HBA2 | HBA | HPORT2 | SPORT6 |
| SWT1 | SWITCH | SPORT1 | HPORT1 |
| SWT1 | SWITCH | SPORT3 | CPORT1 |
| SWT2 | SWITCH | SPORT6 | HPORT2 |
| SWT2 | SWITCH | SPORT9 | CPORT3 |
| SWT2 | SWITCH | SPORT10 | CPORT4 |

FIG.15

| ACCESS PATH | SUBSTITUTE ACCESS PATH IDENTIFIER |
|---|---|
| PATH1 | PATH2, PATH3, PATH4 |
| PATH2 | PATH1, PATH3, PATH4 |
| PATH3 | PATH1, PATH2, PATH4 |
| PATH4 | PATH5, PATH6 |
| ...... | ...... |

METHOD AND AN APPARATUS FOR MANAGING ACCESS PATH

CROSS-REFERENCE TO PRIOR APPLICATION

This application relates to and claims priority from Japanese Patent Application No. 2005-087895, filed on Mar. 25, 2005 the entire disclosure of which is incorporated herein by reference.

BACKGROUND OF THE INVENTION

The present invention relates to a method and an apparatus for managing an access path, and more particularly to a management of an access path in a multi-path system that accesses a storage device by means of plural access paths in a storage area network (SAN).

The popularization of the Internet and transformation of data into multimedia allow the storage capacity of a storage device used in enterprises or the like to increase. An SAN is established for an enormous quantity of data that rapidly increases. In the SAN, plural host computers and a large-capacity data storage device, in particular, a disk array are connected to each other through fiber channels or the like, to thereby realize data sharing and high-speed accessing.

Plural adaptors for connection to the SAN such as host bus adaptors (HBA) and channel adaptors (hereinafter referred to as "CHA"), and plural devices used for connection with fiber channel switches (hereinafter merely referred to as "switches") and hubs exist between the host computers and the storage device. The respective devices are so connected as to ensure plural paths (hereinafter referred to as "physical paths") assuming a defect. Under the circumstances, the connection relationships become remarkably complicated.

Also, in the data storage device such as the disk array, it is possible that a storage area that is made up of plural physical disks is shared to plural logical volumes (hereinafter referred to as "logical volumes"), and then released to a specific host computer. A path (hereinafter referred to as "access path") for accessing to the logical volume from the host computer is set from options of the abovementioned plural physical paths. There has been used a technique by which plural access paths are set with respect to one logical volume, and one access path is switched over to another access path at the time of a defect to continue access operation, or the plural access paths are used at the same time to disperse an access load (hereinafter referred to as "multi-path management").

For example, Japanese Published Unexamined Patent Application No. 2000-330924 discloses that the access load on the storage device is appropriately dispersed to the plural access paths in the technique of the above type.

SUMMARY OF THE INVENTION

However, the number of physical paths and the number of access paths which are to be managed increase under the environments where the storage device is shared to the plural host computers. In addition, it is difficult to grasp the influences of the hosts and applications on each other and form an appropriate access path under the large-scale environments where managers of plural host computers (or plural groups of host computers) and plural applications (hereinafter referred to as "AP") exist.

In the case where a defect occurs in the conventional multi-path management, all of the access paths that suffer from the defect are switched to other access paths. For that reason, there is the possibility that IO traffic on the SAN is greatly changed, and the access paths that have not yet been effected up to now are concentrated on a specific adaptor or switch. As a result, there arises such a problem that a time required for IO associated with a specific AP becomes long, and the operation of significant AP slows down. As described above, it is difficult to grasp the influences of the hosts and applications on each other and again form an access path such that the operation of significant AP does not slow on the large-scale SAN.

An object of the present invention is to provide a method and an apparatus for managing an access path, which grasp in advance a portion that may cause a bottleneck due to the concentration of traffics in a multi-path system, and notify an operation manager of that portion.

More specifically, an object of the present invention is to provide the management of an access path which aggregates information on switchable access paths, and calculate a change in the traffic in the case where the access path is switched to another access path due to the occurrence of a defect of a device such as the respective adaptors or switches, to thereby detect in advance a portion that may cause a bottleneck due to the concentration of traffic at the time of occurrence of the defect and to notify an operation manager of that portion.

According to one aspect of the present invention, there is provided a method for managing an access path in a storage network system that forms multiple paths between a large-capacity data storage device and a host computer that employs the data storage device, and transfers data by means of a selected path, the method including the steps: selecting a second access path that can be used as a replacement of a first access path that connects the data storage device and the host computer; calculating the quantity of traffic on the first access path which is associated with a device disposed on the first access path; calculating a variation of the quantity of traffic on the second access path which is associated with a device disposed on the second access path taking the calculated quantity of traffic into consideration; determining whether the device on the second access path causes a bottleneck or not, according to a calculated value of the variation of traffic on the second access path; and notifying the outside of a determination result.

In a preferable example, the first and second access paths include plural ports of the data storage device, plural adaptors of the host computer, and switches that switch over connection relationships between the ports and the adaptors. Information on identifiers indicative of those connection relationships is displayed on a display device in order to notify a manager of the information as path information of the bottleneck.

Also, it is preferable to reduce a value of the quantity of traffic on the first access path, and add the reduced value to the quantity of traffic associated with the device on the second access path, to calculate the variation of the quantity of traffic in the respective devices on the second access path.

Further, in one example, in the case where plural second access paths exist with respect to the first access path, a value obtained by dividing the calculated value of the traffic quantity on the first access path by the number of second access paths is equally added in calculation of the variation of the traffic quantity in the respective devices on the second access path.

Also, in an example of the determination of the bottleneck, in the case where the calculated value of the variation of traffic is larger than 0, it is determined that there is a bottleneck.

Also, in a preferable example, plural access paths for accessing at least one logical volume formed in the data storage device from the host computer are managed, and a traffic information table that stores the calculated quantity of traffic is prepared with respect to the device on the selected second access path and then stored in a storage device of a server that manages the access path.

In addition, in a preferable example, an access path information table that stores information indicative of a host computer path adaptor of the host computer, a port of the data storage device, an identifier of the logical volume, and an application program stored in the logical volume, which exist on the access path, is stored in the storage device of the server that manages the access path in correspondence with an ID of the access path.

Then, the determination result is notified to the application program registered in the table and the associated manager of with reference to the access path information table.

According to the present invention, there is provided an access path management program that is executed in a storage network system that can connect a host computer that processes information with a storage device that stores the information therein via multiple paths, the program including the steps of: inputting a first device that constitutes a storage network; acquiring a second device where access paths are concentrated and the traffic is increased in the case where all of the access paths that pass through the first device are switched over to other access paths through a multi-path managing process; and transferring information related to the acquired second device to display the information on a display device.

Also, in one example, the access path management program further includes the steps of: acquiring an access path that passes through the second device; and displaying the information on the access path on the display device.

According to the present invention, there is provided a management server that manages an access path between a large-capacity data storage device and a host computer that employs the data storage device in a storage network system that forms multiple paths between the data storage device and the host computer to transfer data by means of a selected path, the management server including: a main memory that stores an access path integration management program for integrally managing the access path, and holds temporal data associated with execution of the program; a processing device that executes the access path integration management program; and a display device that displays a state in which the access path integration management program is executed, wherein the processing device includes means for selecting a second access path that can be used as a substitute of a first access path that connects the data storage device with the host computer by execution of the access path integration management program; means for calculating the quantity of traffic of the first access path which is associated with a device on the first access path; means for calculating a variation of traffic quantity of the second access path which is associated with a device on the second access path taking the calculated quantity of traffic into consideration; means for determining whether the device on the second access path is a bottleneck or not, according to the calculated variation of traffic of the second access path; and means for notifying the outside of the determination result.

In a preferred example, the management server includes a storage device that stores a table that stores structural device information related to a device that constitutes an SAN collected from the host computer therein, a table that stores access path information related to a device or port which constitutes the access path, a table that stores the traffic information related to the traffic of the device and the port on the access port, and a table that stores traffic calculation information indicative of a calculated value related to the variation of traffic with respect to the device on the access path which is obtained by the execution of the access path integration management program.

Also, preferably, the management server further includes: a storage device that stores an access path information table which stores information indicative of a host bus adaptor of the host computer, a port of the data storage device, an identifier of a logical volume, and an application program stored in the logical volume, wherein the determination result is notified to the application program registered in the table and the related manager with reference to the access path information table.

According to the present invention, information on the access path which can be switched over at the time of occurrence of a defect which is held by multi-path management software is collected. In the case where the access path is switched over due to a defect of a device on the access path, a variation in the traffic is calculated, thereby making it possible to grasp a portion that may become a bottleneck by concentration of the traffic in advance. Then, the information related on the bottleneck is notified a system manager of, thereby making it possible to conduct a countermeasure to a delay of the processing operation of AP at the time of occurrence of the defect.

BRIEF DESCRIPTION OF THE DRAWINGS

FIG. 4 is a diagram showing an example of a table of traffic calculation information according to the embodiment;

FIG. 5 is a diagram showing an example of a table of traffic information according to the embodiment;

FIG. 6 is a diagram showing an example of a table of access path information according to the embodiment;

FIG. 7 is a diagram showing an example of a table of SAN structural device information according to the embodiment;

FIG. 15 is a diagram showing an example of a table of a replacement access path identifier list according to the embodiment.

DETAILED DESCRIPTION OF THE PREFERRED EMBODIMENTS

Now, a description will be given in more detail of an embodiment of the present invention with reference of the accompanying drawings.

Figure 12:
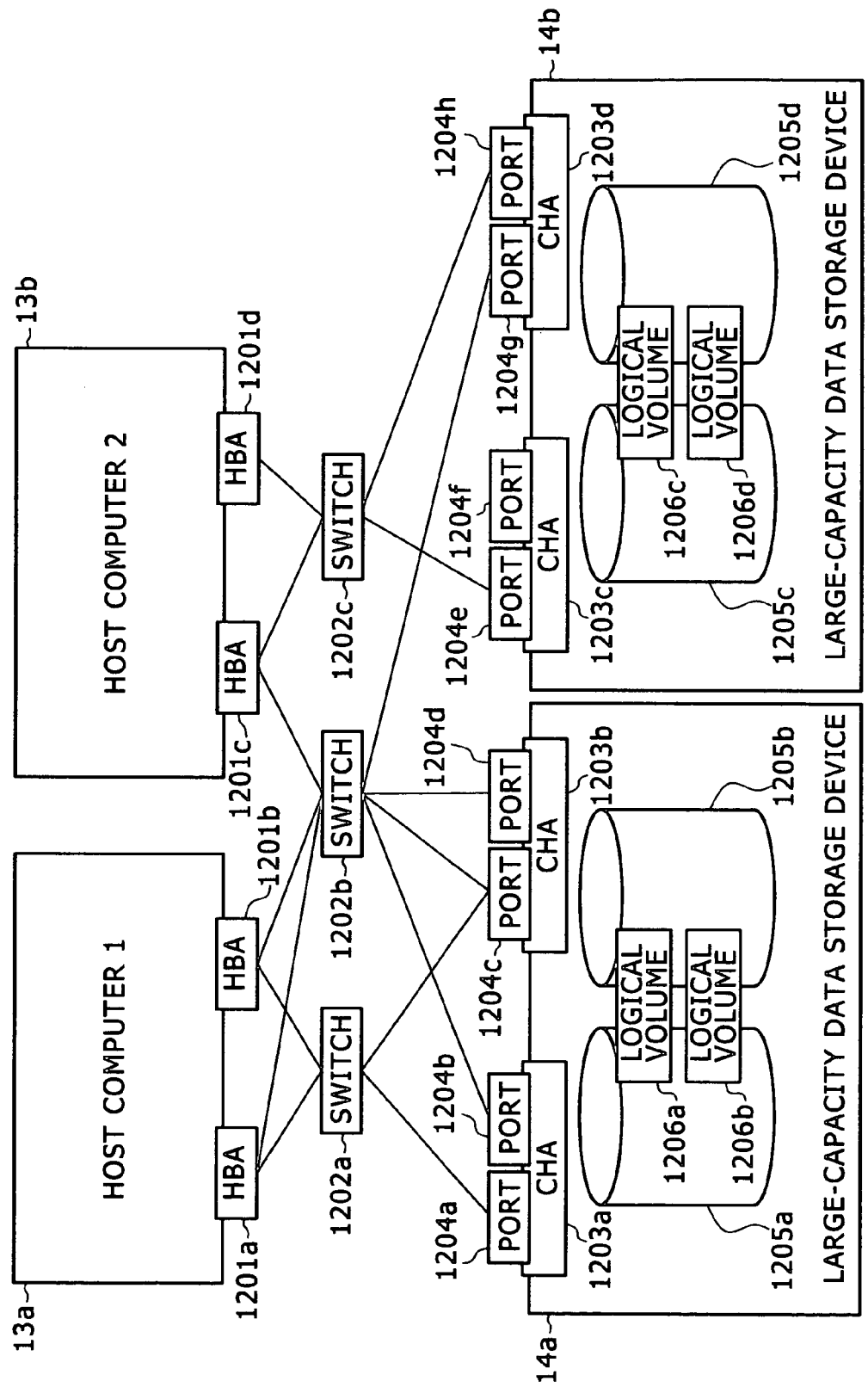
FIG. 12 is a diagram showing a structural example of an SAN system.

FIG. 12 shows a structural example of an SAN system according to an embodiment of the present invention.

A host computer 13 is connected to a port of a connection device such as a switch 1202 or a hub through an HBA 1201. The switch 1202 is connected to a channel adaptor (hereinafter referred to as "CHA") 1203 of a large-capacity data storage device 14 such as a disk array and a port 1204 such as a port controller. The large-capacity data storage device 14 is made up of plural physical disks 1205, and a logical volume 1206 that is a logical access unit is formed on each of the plural physical disks 1205, and the plural logical volumes are released to the host computer.

Figure 13:
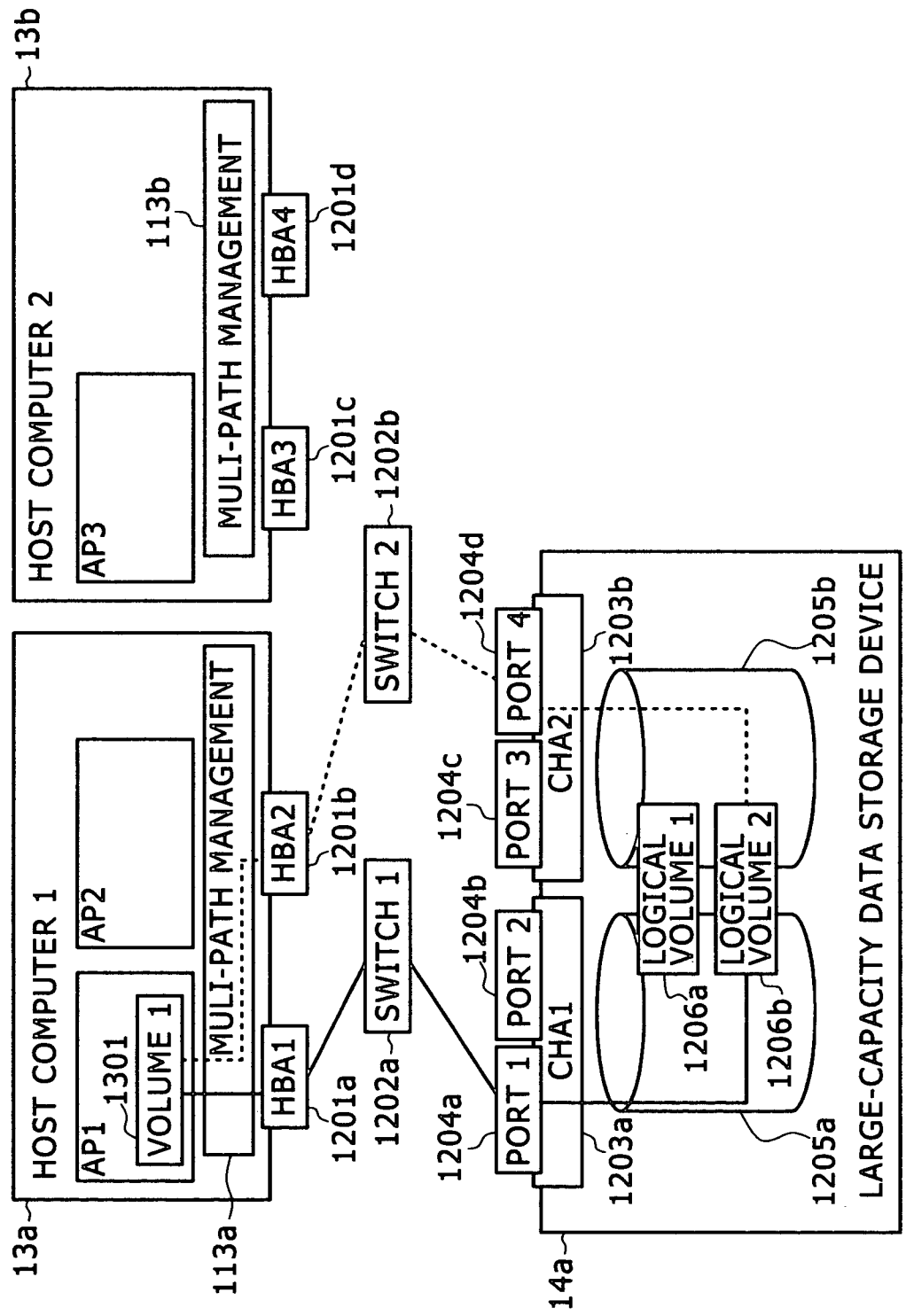
FIG. 13 is a diagram showing an example of access paths under a multi-path management.

FIG. 13 is a diagram showing an example of an access path under a multi-path management that is applied to the SAN system of FIG. 12. For facilitation of viewing, physical paths, storage devices and switches which are unnecessary for description are omitted from FIG. 13. Also, a pair of access paths are shown with respect to one logical volume 1 (1206b) as the logical volume, but in general, plural access paths exist with respect to plural logical volumes, and the multi-path management is applied to those paths.

The access path is set by a management tool of the storage device 14 or SAN management software. First, an identifier of a specific logical volume 1206 and a port 1204 of the storage device 14 are allocated. In an example shown in FIG. 13, the logical volume 1 (1206b) is allocated to a port 1 (1204a) and a port 4 (1204d), respectively. Also, the port 1 (1204a) side is released to a port HBA 1 (1201a) of the host computer 1 (13a), and the port 4 (1204d) side is released to a port HBA 2 (1201b) of the host computer 1 (13a) by setting the access control, respectively. A world wide name (WWN) is allocated to the protocol of a fiber channel as a unique identifier, and used as a unique identifier.

In the example shown in FIG. 13, the logical volume 1 (1206b) has two access paths consisting of an access path that passes through the HBA1 (1201a) of the host computer 1 (13a), the switch 1 (1202a) and the port 1 (1204a) of the storage device (14a), and an access path that passes through the HBA2 (1201b) of the host computer 1 (13a), the switch 2 (1202b) and the port 4 (1204d) of the storage device (14a). The multi-path management 113 is capable of accessing those plural access paths as a volume 1301 that is recognized on one host computer.

In the examples shown in FIGS. 13 and 14, the access path (hereinafter referred to as "active access path") that is in use online is indicated by a bold line, and an access path (hereinafter referred to as "replacement access path") of offline which is a substitute candidate is indicated by a dotted line.

In the case where there occurs a defect of the active access path such as a defect of the HBA or the CHA, a defect of the switch or a defect of a cable, the active access path is switched to one substitute access path among the substitute access paths by priorities that are determined by the multi-path management. The priorities are variously determined, for example, in the order of performance of the CHA that constitutes the access path, or in the smaller order of ID. In any case, it is necessary to uniquely determine the substitute access path.

Figure 14:
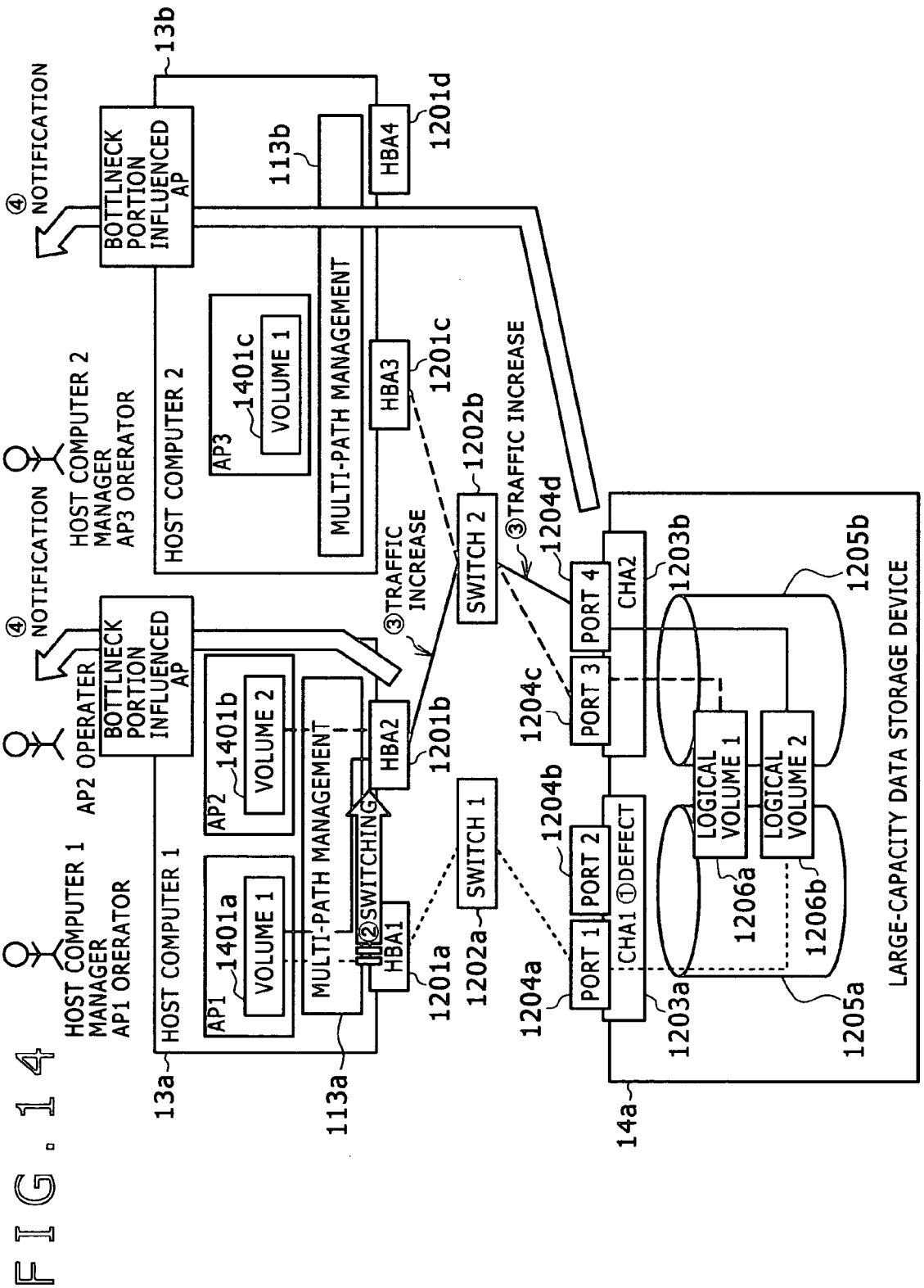
FIG. 14 is a diagram showing a principle of an access path managing method according to the embodiment.

FIG. 14 is a diagram showing a principle of an access path managing method according to an embodiment of the present invention.

A change in the traffic in the case where the access path is switched to another access path due to the occurrence of a defect that may occur in the respective ports or switches is grasped in advance. With this operation, a bottleneck portion at the time of occurrence of the defect is detected in advance, and a problem on the present substitute access path setting is notified to a system manager such as the host computer or the AP.

First, a location of a device that constitutes the SAN at which a defect occurs is assumed. A device such as an HBA, a CHA or a switch will be described as the location of a defect. However, it is easy to apply this embodiment to another location of a defect as with the cable if the multi-path management can acquire the structure of a physical path. Also, in the case where the multi-path management acquires only the structure of the HBA and CHA, it is possible to apply this embodiment to access paths other than the switch.

In the example shown in FIG. 14, in the case where it is assumed that a defect occurs in the CHA1 (1203a), it is grasped where any problem occurs. Then, the same investigation is conducted on other CHA (for example, 1203b), HBA (for example, 1201a, 1201b, 1201c, or 1201d), and switch (for example, 1202a or 1202b) through a loop process, thereby making it possible to investigate a problem on the substitute access path setting in the present SAN structure. Also, in the case where a defect occurs at the plural portions, this embodiment is sequentially applied to the respective portions, and the following process is applied to the access path in which failure occurs at the plural portions only once, thereby making easy to readily apply the present invention.

Subsequently, in the case where failure occurs at the assumed defective portion, an access path to be switched is extracted. Information on a substitute access path for the access path that passes through the assumed defective portion is acquired. In FIGS. 13 and 14, only one access path that passes through the defective portion is shown for simplification. However, there exist plural defective portions, and in this case, the above loop process is sequentially applied.

It is assumed that the defective portion is a CHA1 (1203a) in the case where a failure occurs, an access path that passes through the defective portion, that is, a failure occurs in the access path that passes through the HBA1 (1201a) of the host computer 1 (13a), the switch 1 (1202a), and the port 1 (1204a) of the storage device (14a), and the access path is switched to another access path. As described above, a substitute access path is selected in the order of priority that is determined by the multi-path management. In the example of FIG. 14, the access path is switched to an access path that passes through the HBA2 (1201b) of the host computer 1 (13a), the switch 2 (1202b), and the port 4 (1204d) of the storage device 14a, A state of the use access pass is represented by a bold line.

Subsequently, a change in the traffic to the switch of the access path is grasped. Because the access path that passes through the defective portion does not become the use access path, the traffic of that access path is reduced from the device on the access path. Also, it is assumed that the abovementioned reduced traffic is increased in the device on the access path with respect to the access path that switches from the substitute access path to the use access path.

Therefore, each of the respective devices adds an increment and a decrement of the traffic to the port of the device, and calculates a change in the quantity of traffic in the case where the access path is switched. In this example, as a method of calculating the traffic that passes through the access path, there is a method in which the multi-path management manages performance information (for example, the number of IO) on the access path or the like, and then acquires the traffic from the multi-path management. Also, as a method other than the multi-path management, there is a method in which there exists software for acquiring the performance information, and statistic information on the access path or a volume 1401 is acquired according to a performance information acquirement command of the multi-path management or OS. In addition, there is a method in which statistic information on the volume 1401 is acquired from a statistic information tool of AP. Also, the IO traffic to be used may be a certain instantaneous value or calculated by a statistic manner of the maximum value or an average value in a given period of time.

FIGS. 13 and 14 show an example in which the access path is switched when a failure occurs. In the case of using the function of the multi-path management 113 that disperses the traffic in the plural access paths, the traffic as much as a quantity calculated to be reduced due to the failure of one access path is equally shared to the remaining access paths and added, thereby making possible to calculate an increase. In the case where the multi-path management 113 uses a specific dispersing method, the increase may be calculated according to the method.

Finally, information on bottleneck of the access path, the device, the volume or the AP which become the bottleneck is notified to a system manager who uses a portion which is judged to be the bottleneck with a rapid increase in the traffic on a specific device due to a change in the traffic.

As a method of judging the bottleneck, there are proposed a method of merely determining whether the traffic is increased or not, a method of determining whether the traffic is rapidly increased to twice or three times or not, a method of registering the allowable amount of the traffic due to the specification of the device in advance and judging whether the actual traffic amount exceeds the allowable amount or not, and a method of calculating the allowable amount of the traffic of the device by an actual measurement and judging whether the actual traffic amount exceeds the allowable amount or not. Also, there is proposed a method of inputting the amount of traffic by a function defined by a user and defining conditions using a calculating formula for determining whether there is a bottleneck or not, and using the conditions for judgment of the bottleneck.

Then, an access path that passes through a portion which is judged as the bottleneck is extracted. In the example of FIG. 14, in the case where an HBA2 (1201*b*) is judged as the bottleneck, an access path that passes through the HBA2 (1201*b*), a switch 2 (1202*b*), and a port 3 (1204*c*) of the storage device (14*a*) to the volume 2 (1401*b*) of the host computer 1 (13*a*) passes through the HBA2 (1201*b*), and the access path is influenced by the HBA2 (1201*b*). A manager of the volume 2 (1401*b*) of the host computer 1 (13*a*) or the system (for example, AP2) using the volume 2 (1401*b*) is notified of information on the bottleneck such as information on a device which is an assumed defective portion, a portion that is judged as the bottleneck and AP influenced by the portion, or a volume that stores the data. It is needless to say that plural portions that are judged as the bottleneck may exist.

In the example of FIG. 14, in the case where a port 4 (1204*d*) of a CHA2 (1203*b*) is judged as the bottleneck, an access path that passes through an HBA3 (1201*c*), a switch 2 (1202*b*) and a port 4 (1204*d*) of the storage device (14*a*) to a volume 1 (1401*c*) of a host computer 2 (13*b*) passes through the port 4 (1204*d*), and the access path is influenced by the port 4 (1204*d*). A manager of the volume 1 (1401*c*) of the host computer 2 (13*b*) or AP3 who uses the volume 1 (1401*c*) is notified of information on the bottleneck such as information on a device that is an assumed defective portion, a portion that is judged as the bottleneck or an AP that is influenced by the bottleneck, or a volume that stores the data. The AP, the volume for storing the data of the AP, the identifier of the manager, a method of notifying the manager may be registered in a database by software for management of an access path and then managed, or may be used in association with information on an application server or a directory server. As the notifying method, there can be applied a generally employed method such as a method of displaying the information on a display device of the related manager, a method of sending the information by e-mail, or a method of recording the information in a log and making the manager refer to the information timely.

Figure 1:
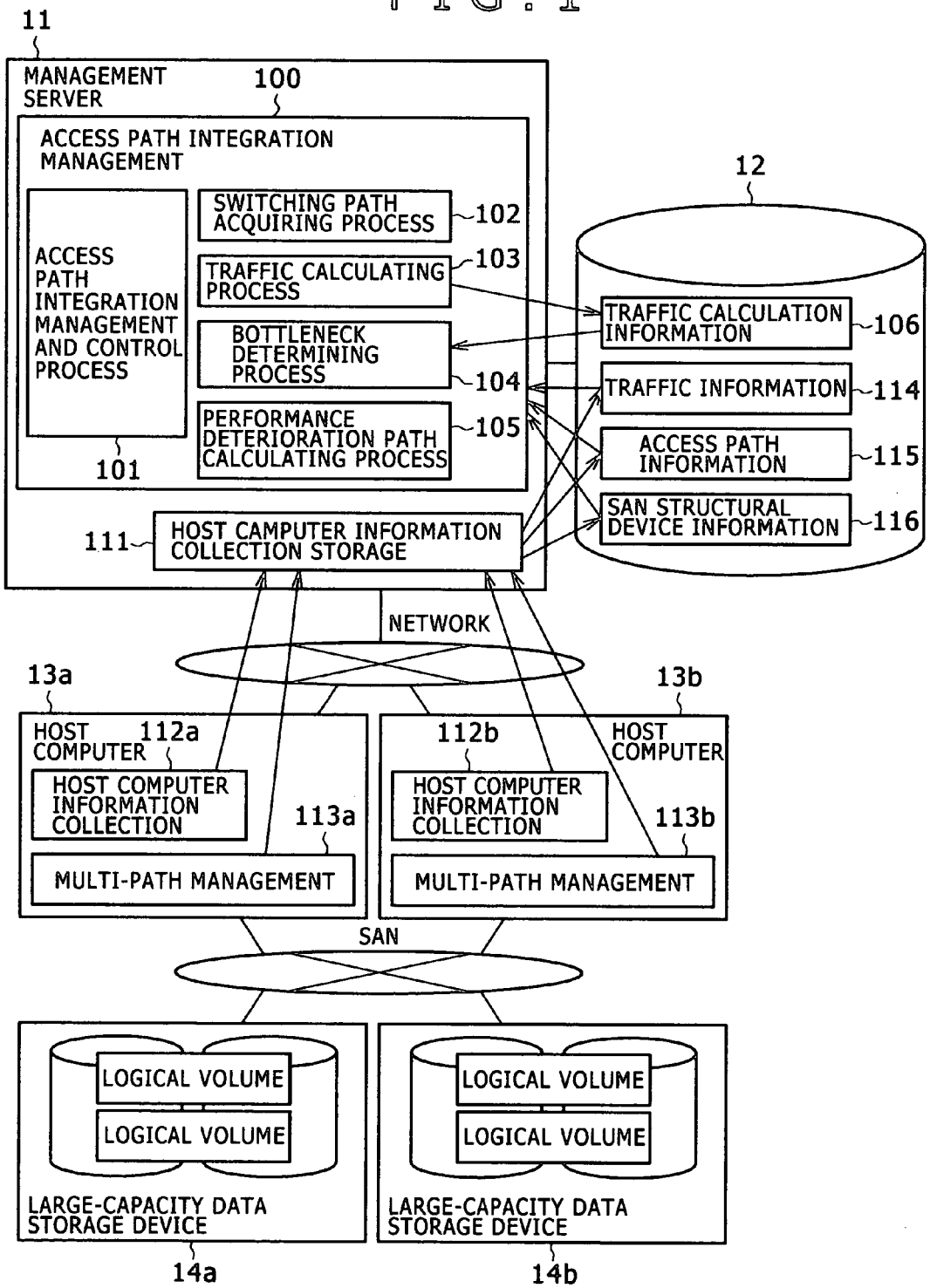
FIG. 1 is a diagram showing an access path management system that is applied to the SAN according to an embodiment of the present invention.

FIG. 1 is a diagram showing an access path management system that is applied to an SAN system according to an embodiment of the present invention.

The SAN system (FIG. 12) is made up of plural host computers 13 that are connected to the SAN, and plural large-capacity data storage devices 14. In this embodiment, the host computers 13 are connected to a management server 11 that manages the access path in the SAN system through a network. Also, the management server 11 has a storage device 12 that stores information for managing the access path.

The management server 11 executes an access path integration management program 100 for managing the access path of the SAN system in an integrating manner. The access path management program 100 includes the respective processing functions of a switching path acquiring process 102 that switches an access path to be switched over from the assumed defective portion, a traffic calculating process 103 that calculates a change in the traffic with respect to the switching of the access path, a bottleneck determining process 104 that determines a bottleneck according to the calculation of the change in the traffic, a performance deterioration path calculating process 105 that extracts an access path which is calculated to be deteriorated in the performance by passing therethrough with respect to a portion that is determined as the bottleneck, and an access path integration management and control process 101 that controls the respective processes and sequentially applies those processes to the respectively assumed defective portions.

On the other hand, each of the host computers 13 has a host computer information collecting program 112 having a function for acquiring the performance information of the host computer and a function for collecting the host computer information due to the SAN management software, and a multi-path management program 113 for conducting the management of the multi-paths and the switching control shown in FIGS. 12 and 13. The multi-path management program 113 is software that conducts the general multi-path management which switches over the access path at the time of a defect or disperses a load of access by using plural access paths at the same time.

The storage device 12 of the management server 11 stores a structural device information 116 related to devices that constitute the SAN which is collected from a multi-path management program 113 or a host computer information collecting program 112 of each of the host computers 13, an access path information 115 related to the devices and the ports which constitutes the access path, and a traffic information 114 related to the traffic of the devices and the ports on the access path. Also, the storage device 12 stores traffic calculation information 106 indicative of a calculation value related to a variation in the traffic with respect to each of the devices on the access path, the value obtained as a result of execution of the access path management according to this embodiment.

The access path management program 100 executes the management of the access path by using those information 114 to 116 which are stored in the storage device 12. The traffic calculating process 103 calculates a traffic calculation information indicative a calculation value related to the variation in the traffic with respect to each of the devices on the access path. The bottleneck determining process 104 calculates and detects a portion that becomes the bottleneck according to the calculation result made by the traffic calculation process 103.

Figure 2:
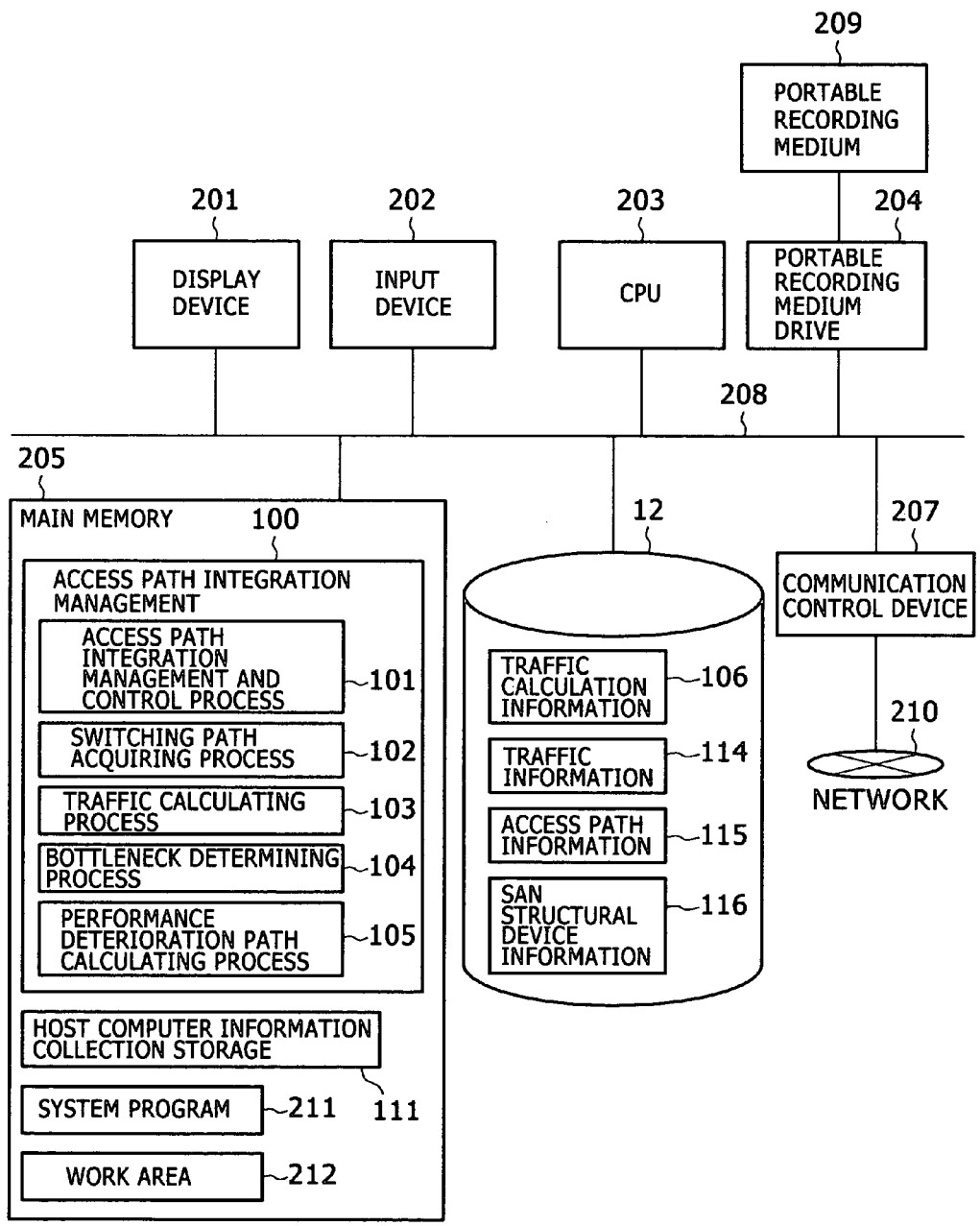
FIG. 2 is a structural diagram showing a management server in the access path management system according to the embodiment.

FIG. 2 is a structural diagram showing the management server 11 according to the embodiment of the present invention. The management server 11 is constituted as a computation system having a display device 201, an input device 202, a central processing unit (CPU) 203, a portable medium drive 204, a main memory 205, a storage device 12 such as a disk drive, and a communication control device 207, which are connected to a system bus 208.

The display device 201 displays the executed status of the database management system program. The input device 202 is used for inputting various information. In this embodiment, the input device 202 is further used to input a command that is instructed in the execution of the access path management program. The central processing unit 203 executes various programs that constitute the access path management according to this embodiment. The portable medium drive 204 is used for writing data on the portable medium 209 such as a flexible disk, a magnetic optical disk or a write once optical disk.

The main memory 205 holds the above various programs, and temporal data associated with the execution of program. The storage device 12 stores the above various information therein. The communication control device 207 communicates with the network 210. In this embodiment, the communication control device 207 particularly conducts communications such as a request for collecting information on the access path or the traffic from each of the host computers 13, and the exchange of data.

The main memory 205 ensures a work area 212, and also stores program such as a system program 211 and an access integration management program 100. The work area 212 is used for storing data that is temporally required in the execution of the program. The system program 211 provides a basic processing function for executing various programs including the access path integration management program 100 such as input and output of data with respect to a peripheral device. In this embodiment, the main memory 205 stores therein the access integration management program 100 including the access path integration management and control process 101, the switching path acquiring process 102, the traffic calculating process 103, the bottleneck determining process 104, and the performance deterioration path calculating process 105. However, in another example in which the above respective processing functions are constituted as individual programs, respectively, the program for each of those processing functions is stored in the main memory 205. Those programs are taken in the main memory 205 from the portable medium 209 through the drive 204, or from the network 210 through the communication control device 207.

In this embodiment, the traffic calculation information 106, the traffic information 114, the access path information 115, and the SAN structural device information 116 are stored in the storage device 12. However, the present invention is not limited to this structure. For example, it is possible that the information is collected from the host computer 13 as needed, and then temporally stored in the memory 205.

Figure 3:
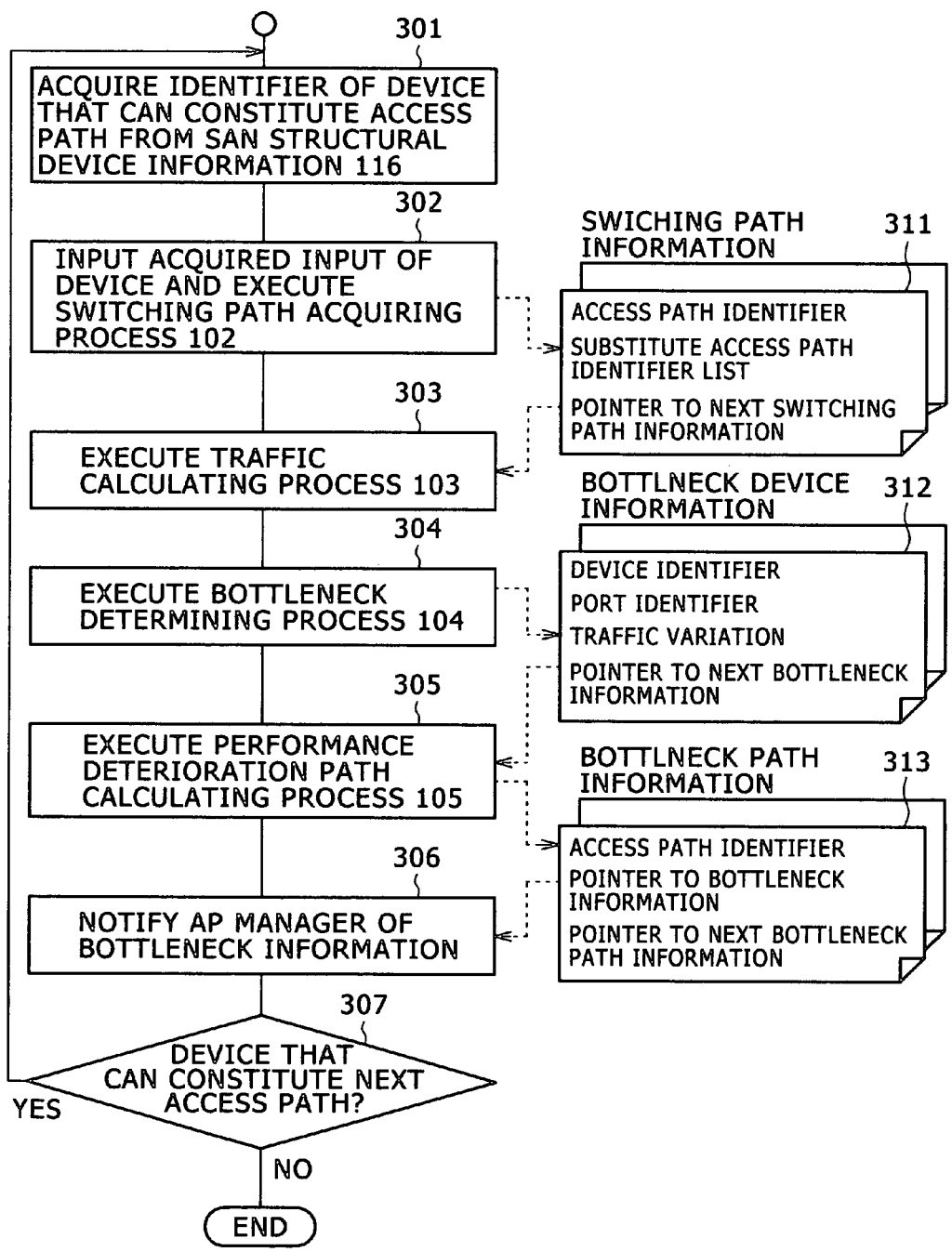
FIG. 3 is a flowchart for explaining an access path integration management and control system process according to the embodiment.

FIG. 3 is a flowchart showing the processing of the access path integration management and control system process 101 according to an embodiment of the present invention.

First, the access path integration management and control process 101 according to this embodiment will be totally described with reference to FIG. 3. Thereafter, the respective characteristic processing will be described in more detail with reference to FIGS. 8 to 11.

In FIG. 3, an identifier of the device that can form a part of the access path is acquired from the information 116 of the device that constitutes the SAN as the assumed defective portion (S301). Then, the switching path acquiring process 102 that extracts an access path to be switched over from the assumed defective portion is executed with the acquired identifier of the device as an input (parameter) (S302). Then, the traffic calculating process 103 that calculates a change in the traffic is executed with the information 311 on the switching path which is extracted from the switching path acquiring process 102 as an input (S303). Then, the bottleneck determining process 104 that determines a portion that is calculated as the bottleneck is executed with the information 106 that records the calculated value of the variation in the traffic with respect to the respective devices on the access path which is prepared by the traffic calculating process 103 as an input (S304).

Subsequently, the performance deterioration path calculating process 105 that extracts the access path that is calculated to be deteriorated in the performance is executed with the information 312 on the device that is calculated as the bottleneck which is detected by the bottleneck determining process 104 as an input (S305). Finally, the information 313 on the access path that is calculated to be deteriorated in the performance which is calculated by the bottleneck determining process 104 is used, and the information on the bottleneck such as the device that is the assumed defective portion, the access path that becomes the bottleneck, the volume of the access path, the AP that uses the volume, and the device that becomes the bottleneck is notified to the system manager (S306). As the notifying method, the information may be display on the display device of the manager or transmitted via e-mail as described above.

In the subsequent processing, the above process is repeated on the device that can form a part of the access path (S307).

FIG. 4 is an example showing a table of the traffic calculation information 106 according to the embodiment.

The traffic calculation information 106 is information that stores the quantity of traffic which is changed according to the switching of the access path with respect to the device and the port which constitute the access path. The traffic calculation information 106 includes identifiers 401 of the devices, device identifications 402, identifiers 403 of the ports, and variations 404 in the traffic.

In this example, the identifiers 401 of the device are information for identifying the devices on the access path, and the device identifications 402 indicate those devices. Also, the identifiers 403 of the ports are information for identifying the ports of those devices. The traffic variations 404 represent an increase and decrease (+and −) of the traffic quantity after calculation, and its unit is megabit/sec (Mbps) or byte/sec which are used for the unit of a data transfer speed.

In the example of FIG. 4, a device or port which causes the variation in the traffic quantity is applied, but the initial value of the variation may be held to 0 or NULL value with respect to all of the devices or ports. In the example of FIG. 4, different types of devices such as an HBA or a CHA are collected in one table so as to be distinguishable according to the identification 402 of the devices. Alternatively, the devices of the same type may be collected in each of the different tables and managed. In addition, in the example of FIG. 4, the relative variation 404 of the traffic is stored in the table. Alternatively, it is possible that the variation 404 of the traffic is held as an absolute quantity such as the calculated values of the traffic quantity before switching the access path and the traffic quantity after switching the access path in advance, and the quantity to be varied is obtained later.

FIG. 5 shows an example of a table of the traffic information 114 in the embodiment.

The traffic information 114 is information on the traffic of the devices or the ports on the access path which is acquired from the host computer information collecting function 112 by the multi-path management software 113 of the respective host computers 13 or the performance information acquiring software. The traffic information 114 includes identifiers 501 of the devices, types of the devices 502, identifiers 503 of the ports, and the quantity of traffic 504. As the traffic quantity 504, the quantity of data which can be transferred per one second such as megabit/sec (Mbps) or byte/sec which are used in the unit of the data transfer speed of an HBA, a CHA or a cable can be used.

In this example, the traffic quantity 504 indicates the calculated quantity of traffic before switching. The traffic quantity 504 may be a certain instantaneous value or the maximum value or an average value in a given period of time which is calculated by the statistic manner. Also, in the example of FIG. 5, the device and the port having the variation of the traffic quantity are shown as in FIG. 4. However, the quantity of traffic in all of the devices and ports may be acquired and held.

FIG. 6 shows an example of a table of the access path information 115 according to the embodiment.

The access path information 115 is information on the access path which is acquired from the host computer information collecting function 112 by the multi-path management software 113 of the respective host computers 13 or the software for acquiring the performance information.

The access path information 115 includes identifiers 601 of the access paths, identifiers 602 of the host computers, identifiers 603 of the logical volumes 1206, AP 604 that is stored in the logical volume, information 610 on the AP operating manager, identifiers 605 of the ports 1204 of CHA of the storage device 14, identifiers 606 of the ports 1201 of HBA of the releasing host computers 13, a switch port list 607, a priority 608 based on the order of priority which is determined by the multi-path management 113, and the quantity of traffic 609. In this embodiment, the access path information 115 includes the switch port list 607 that represents the information on the switches, from which the information on the switch 1202 can be acquired by the multi-path management 113 of the host computer.

In the example of FIG. 6, the information on the structure of the access path and the information on the traffic are collected in one table. However, the information may be managed in different tables, respectively. For example, information on the relationships of the volume 603, the AP 604 and the operating manager 610 may be in another table format.

Also, in the example of FIG. 6, the priority 608 is indicated. However, the priority 608 may be eliminated in the case where the order of priority made by the multi-path management 113 can be determined according to other information such as the smaller order of the identifiers 605 of the ports of CHA or the identifiers 606 of the ports of the HBA. Also, in the example of FIG. 6, the identifiers of the CHA and the identifiers of the port are stored in one column, but may be held in the different columns.

Further, in the structure of the SAN where the switches 1202 are connected to each other and complicatedly weaved, there is a case in which the physical access path related to the switch is not uniquely determined. Even in this case, the concept of the present invention can be applied to this case by holding the plural switch port lists 607 in advance, and equally sharing the increased value of the traffic quantity to the respective physical access paths. As another method, in the case where the switch 1202 uses the control method of a specific access path, the increase may be calculated according to that method.

FIG. 7 shows an example of a table of the SAN structural device information 116 according to the embodiment.

The SAN structural device information 116 is information on the devices that constitute the SAN which is acquired from the host computer information collecting function 112 by the multi-path management software 113 of the respective host computers 13 or the SAN management software. The SAN structural device information 116 includes an identifier 703 of the port of a connecting device and an identifier 704 of the port of a connected device in association with a device identifier 701 and a device type 702.

In the example of FIG. 7, the devices 701 of the different type such as HBA or CHA are collected in one table so as to be distinguishable according to the type 702 of the device. However, the devices of the same types may be managed in each of different tables, respectively.

Subsequently, a description will be given in more detail of the access path integration management and control process shown in FIG. 3 with reference to FIGS. 8 to 11.

Figure 8:
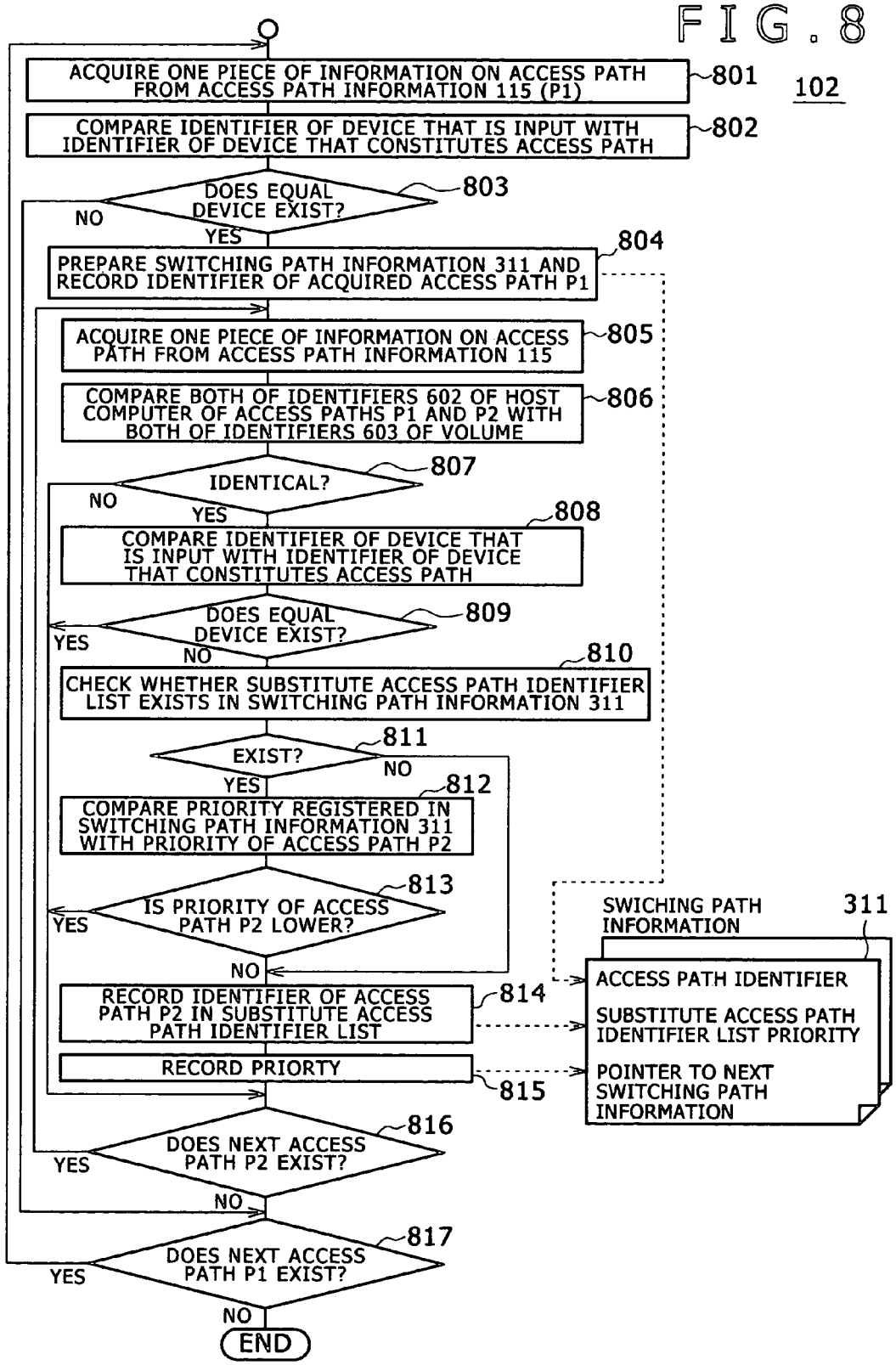
FIG. 8 is a flowchart for explaining a switch path acquiring process according to the embodiment.

FIG. 8 is a flowchart showing a switching path acquiring process 102 according to the embodiment. As shown in FIG. 3, the switching path acquiring process is executed with the identifier of a device that is an assumed defective portion as an input (S302). Since an access path that passes through the device which becomes an input is an access path to be switched, the information on a substitute access path as well as the access path to be switched is extracted from the information 115 on the access path.

First, the information 115 on the access path is sequentially retrieved (S801, S817), and the identifier of the device that becomes an input is compared with the identifier of the device that constitutes the access path (S802, S803). The comparison is conducted with reference to the information on the corresponding device such that the information 606 on the HBA is referred to when the device is the HBA, or the information 605 on the CHA is referred to when the device is the CHA. When the devices that constitute the access path include a device that is an input, that is, an assumed defective portion, since that device is an access path to be switched, the information 311 on the switching path is prepared and registered (S804). Since there exist plural access paths that pass through the assumed defective portion and switch over, plural information on the switching path can be held with a list.

Subsequently, a substitute access path that becomes a switched access path with the acquired access path (P1) is extracted by sequentially retrieving the information 115 on the access path (S805, S816). In the case where the same volume 1206 communicates with the same host computer 13 through different access paths, those access paths become candidates. The access path (P2) that coincides with both of the identifier 602 of the host computer and the identifier 603 of the volume is extracted (S806, S807), and the access path that is applied as the switched access path is selected. First, if P2 includes a device that is an input, that is, the assumed defective portion, since its access path is also defective and cannot be used, the access path is compared with the device that constitutes the access path, and removed (S808, S809).

Subsequently, because there exist plural substitute access paths, the access path that is high in priority is extracted by comparing the priority. When there does not yet exist the list of the identifiers of the substitute access paths of the information 311 on the switching path (S810, S811), and the access path is the substitute access path that has been first extracted, P2 and the information on the priority are recorded in the switching path information 311 (S814, S815).

On the other hand, in the case where the access path has been already registered in the list of the identifiers of the substitute access paths as the candidates to be switched (S810, S811), the priorities are compared, and P2 is removed if the priority of P2 is lower (S812, S813). When the priority of P2 is higher, the information on P2 and its priority is recorded in the switching path information 311 (S814, S815). Also, in the case where there exist plural access paths having the same priority, plural access paths are registered in the list of the identifiers of the substitute access paths as the candidate to be dispersed as the plural access paths being dispersed and used, thereby making it possible to apply the access path to the dispersion. In this case, in a process of registering P2 in the switching path information 311 (S814), P2 may be added in the list of the identifiers of the substitute access paths.

Also, in the case where all of the substitute access paths pass through the assumed defective portion, and there is no switching access path, nothing is recorded in the substitute access path identifier list of the switching path information 311, and an initial value such as NULL remains in the substitute access path identifier list. In this case, as a problem that there is no switching access path, it is considered that the information on the access path is notified to a manager or an AP operator.

Figure 9:
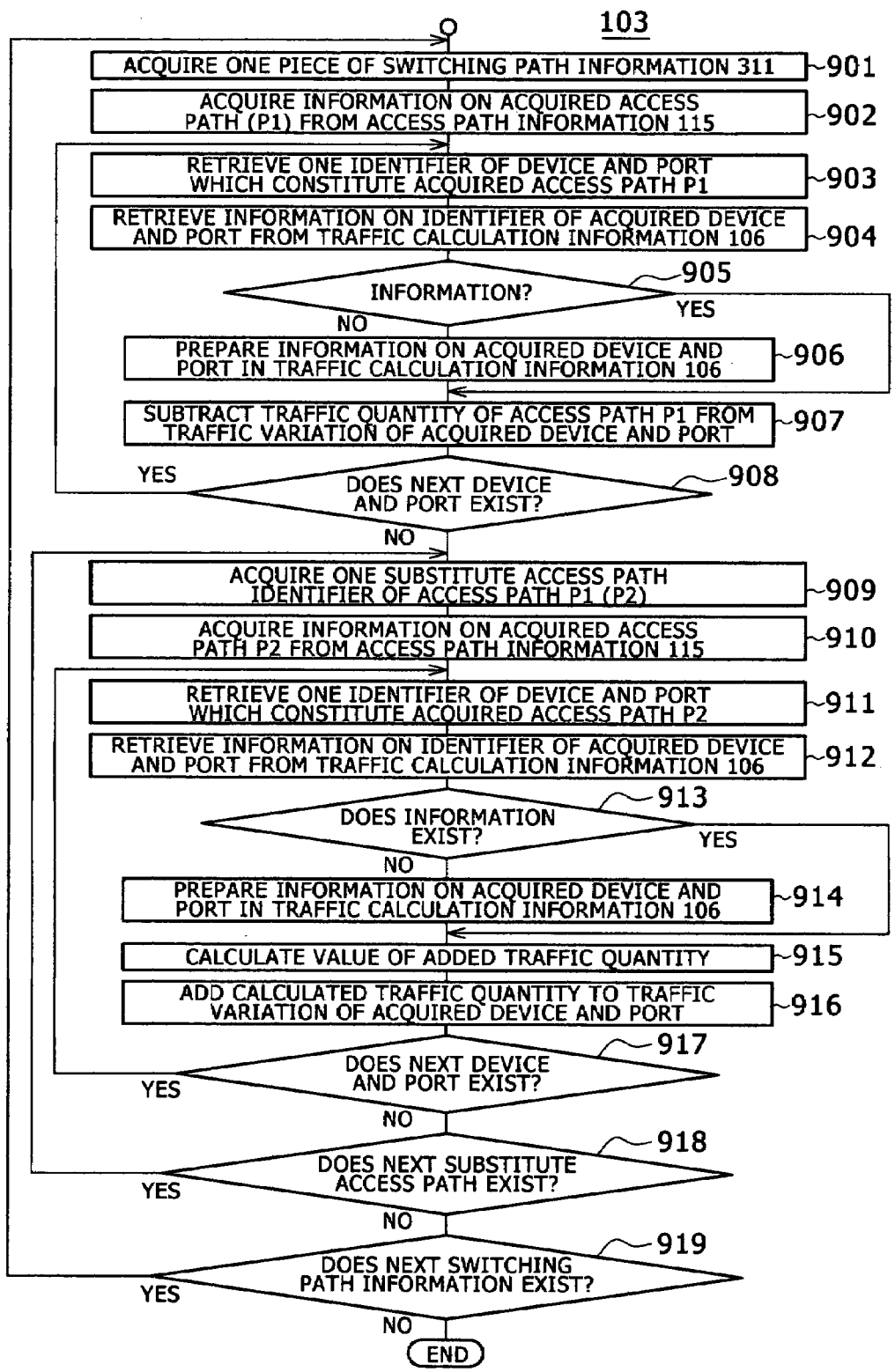
FIG. 9 is a flowchart for explaining a traffic calculating process according to the embodiment.

Subsequently, the processing operation of the traffic calculating process 103 will be described with reference to FIG. 9.

As shown in FIG. 3, the traffic calculating process is executed with the information 311 on the switching path which is extracted from the switching path acquiring process 102 as an input (S302). The quantity of traffic is subtracted from the device and the port which pass through the access path (P1) to be switched over to another access path, and the increased quantity of traffic is added to the device and the port which pass through the access path (P2) to which the defective access path is to be switched over.

Since there exist plural access paths that pass through the assumed defective portion and are switched over, the respective switching path information is sequentially processed (S901, S919).

First, the information on the access path P1 which is to be switched over another access path is acquired from the access path information 115 (S902). The identifiers of the device and the port which constitute the access path are sequentially acquired from the acquired information on the access path P1 and then processed (S903, S908). The information on a change in the traffic with respect to the acquired device and port is retrieved from the traffic calculation information 106 (S904). In the case where there is no information on the acquired device and port, the information on the newly acquired device and port is added, and the initial value of the variation in the traffic is set to 0 (S906). Then, the quantity of the traffic of the access path P1 is subtracted from the variation in the traffic with respect to the acquired device and port (S907).

Subsequently, the substitute access path is sequentially acquired from the substitute access path identifier list as the access pass to which the defective access pass is switched over (P2), and then processed (S909, S918). The information on the access path P2 is acquired from the access path information 115 (S910). The identifiers of the device and the port which constitute the access path are sequentially acquired from the acquired information on the access path P2, and then processed (S911, S917). The information on the change in the traffic with respect to the acquired device and port is retrieved from the traffic calculation information 106 (S912). In the case where there is no information on the acquired device and port, the information on the device and port which have been newly acquired is added, and the initial value of the variation in the traffic is set to 0 (S914).

Subsequently, the increased quantity of traffic is calculated (S915). As a calculating method, there is a method in which the traffic 608 that is calculated to be reduced due to the defect of one access path is equally divided by the number of the remaining access paths, for example, the number of substitute access path identifiers that have been recorded in the substitute access path identifier list, and then added, to thereby calculate the increased quantity. In this example, the substitute access path identifier list is stored in the storage device 12 and prepared in advance as shown in FIG. 15.

As another calculating method, in the case where the multipath management 113 uses a specific dispersing method, for example, such that the specific gravity of the faster device is increased, the increased quantity may be calculated according to the method. Then, the calculated quantity of traffic is added to the variation in the traffic of the acquired device and port (S916).

Subsequently, the processing operation of the bottleneck determining process 104 will be described with reference to FIG. 10.

As shown in FIG. 3, the bottleneck determining process is executed with the traffic calculation information 106 indicative of the variation in the traffic with respect to the respective devices on the access path which is prepared by the traffic calculating process 103 as an input (S303). It is determined whether the increased quantity of traffic becomes a bottleneck with respect to the device and port in which the traffic is changed. Since there generally exist plural devices and ports in which the traffic is changed, the respective data of the traffic calculation information 106 is sequentially processed (S1001, S1006).

First, the quantity of traffic 504 which is the calculation quantity of the traffic before switching with respect to the devices and ports in which the acquired traffic is changed is acquired from the traffic information 114 (S1002). The variation 404 in the traffic after switching in the traffic calculation information is compared with the calculation quantity 504 of the traffic before switching (S1003). Then, it is determined whether a rapid increase of the traffic becomes the traffic or not (S1004).

As a method of determining the bottleneck, there are, for example, the following methods.

Figure 10:
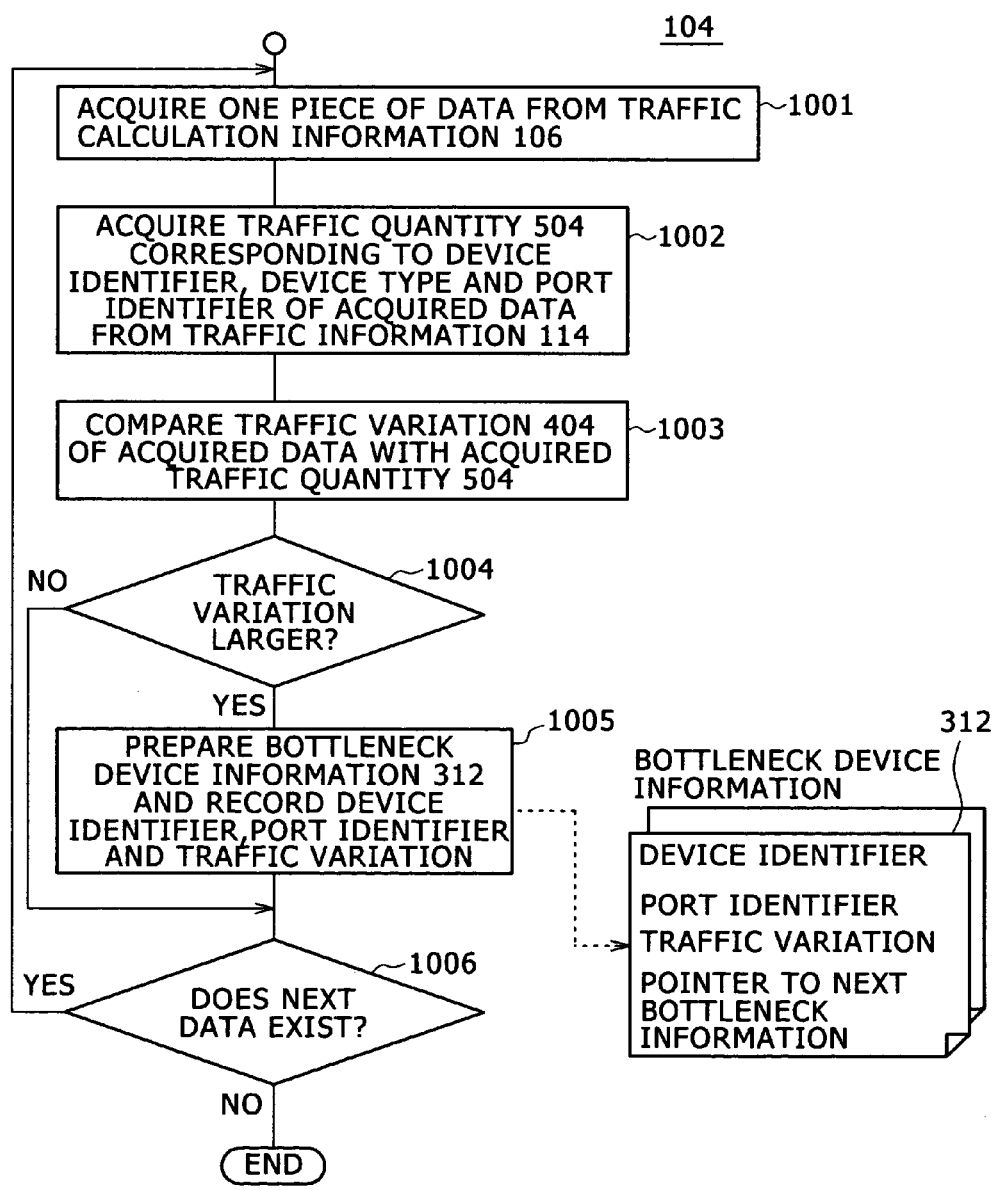
FIG. 10 is a flowchart for explaining a bottleneck determining process according to the embodiment.

In the example of FIG. 10, a case in which an increase in the traffic after switching becomes larger than that before switching, that is, that traffic is rapidly increased twice is regarded as the bottleneck. As other methods, there are proposed a method of determining that there is the possible of the bottleneck when the traffic is merely increased, a method of registering the maximum value of the traffic due to the specification of the device in advance, and determining whether the increase in the traffic exceeds the maximum value or not, and a method of calculating the maximum value of the traffic of the device by an actual measurement, and determining whether the increase in the traffic exceeds the maximum value or not. In addition, there is proposed a method in which the quantity of traffic is inputted by a user's defined function, and conditions are defined by a calculating formula that determines whether there is the bottleneck or not, and the condition is used for determination.

In the case where it is determined by the above methods that there is the bottleneck, the bottleneck device information is prepared, information on the device identifier, the port identifier and the variation in the traffic which are determined as the bottleneck is prepared, and recorded in the storage device 12 once in order to notify the manager of the information (S1005).

Figure 11:
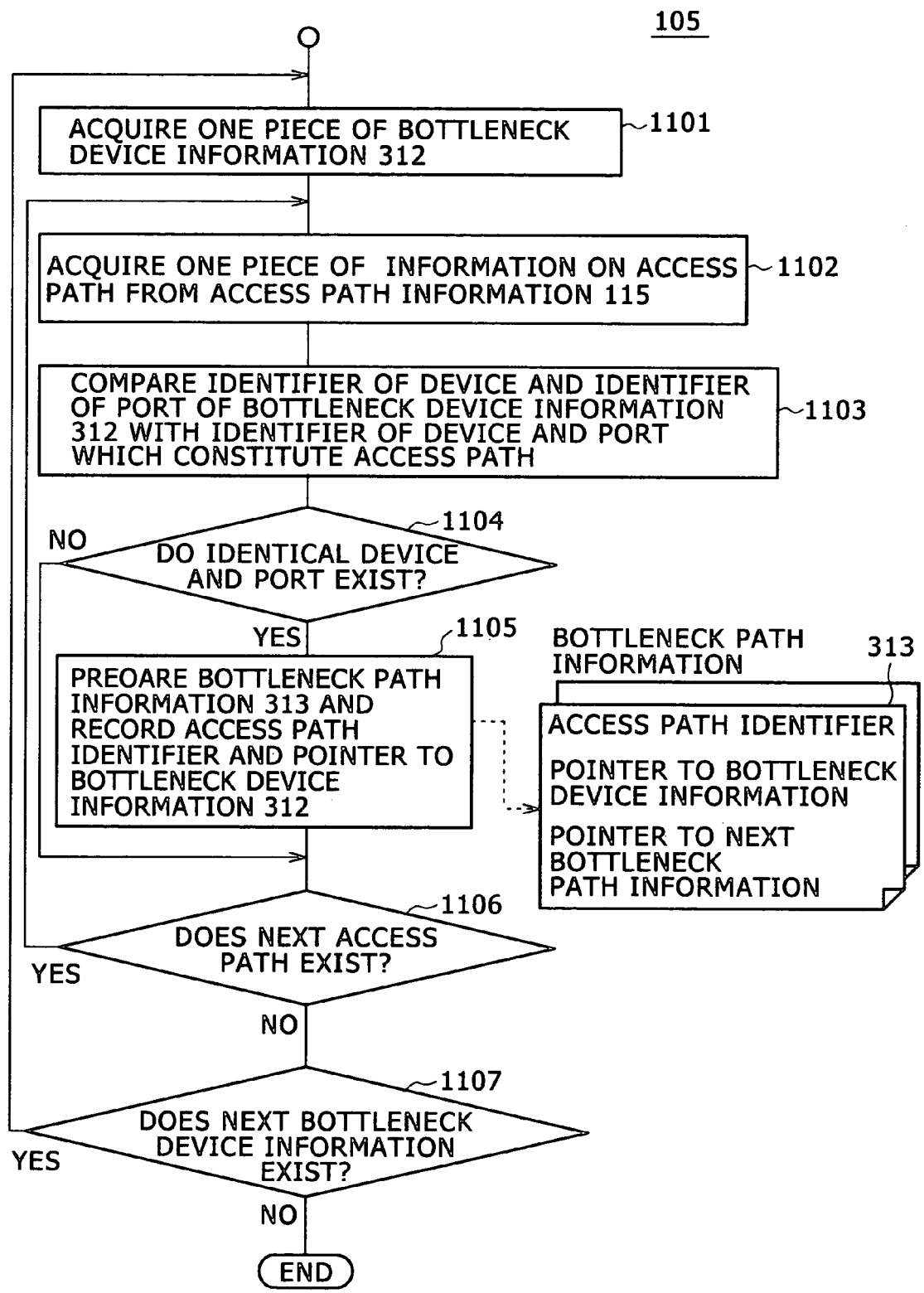
FIG. 11 is a flowchart for explaining a performance deterioration path calculating process according to the embodiment.

Subsequently, the processing operation of the performance deterioration path calculating process 105 will be described with reference to FIG. 11.

The performance deterioration path calculating process 105 is executed with the information on the device that is calculated to be the bottleneck detected by the bottleneck determining process 104 of FIG. 3 as an input (S304). The access path that passes through a portion which is determined as the bottleneck is estimated as an access path having the possibility of the performance deterioration, and then extracted.

Since there exist plural devices or ports which are determined as the bottleneck, the respective bottleneck device information 312 is sequentially processed (S1101, S1107).

First, the information 115 on the access paths is sequentially retrieved (S1102, S1106), and the identifiers of the devices and ports which are judged as the bottleneck are compared with the identifiers of the device and ports which constitute the access paths (S1103, S1104). In the case where there exist the identical device and port, since there is the access path that passes through the portion to be determined as the bottleneck, the bottleneck path information 313 is prepared. Then, information on the identifier of the access path which is calculated as having the possibility of the performance deterioration, and a pointer to the bottleneck device information is prepared, and then stored in the storage device 12 once in order to notify the manager of the information (S1105).

Thereafter, the bottleneck path information 313 is transferred to the manager by e-mail with reference to the AP 604 and the operating manager 610 which are registered in correspondence with the access path that passes through the portion to be judged as the bottleneck with reference to the table of the access path information 115 (FIG. 6). Then, the bottleneck path information 313 is displayed on the display device 201 to notify the manager of the bottleneck path information 313.

As has been described above, according to this embodiment, the information on the switchable access path is collected in advance, and a change in the traffic when the access path is switched over due to the occurrence of the defect of the device such as the respective adaptors or switches is calculated. As a result, the traffic is concentrated at the time of occurrence of the defect, the portion that can be the bottleneck is detected in advance, and the detected information can be notified to the host computer or the manager of AP.

In particular, since the access path is switched over by the multi-path management, information on the logical volume having the possibility that the access from the host computer becomes late, and AP having the possibility that the access to the logical volume in use becomes late is displayed on the display device so as to be notified to the manager.

The manager can readily conduct such work as to weave the access path to the portion that is notified to be concentrated in the access path. As a result, it is possible to improve the important AP operation that leads to the performance deterioration or a reduction in the processing speed which are attributable to the switching of the access path.

The present invention is not limited to the above embodiments, but it is needless to say that the present invention is variously modified within a scope of the subject matter of the present invention.

What is claimed is:

1. A method for managing an access path in a storage network system that forms multiple paths between a large-capacity data storage device and a host computer that employs the data storage device, and transfers data by means of a selected path, the method comprising:

selecting a second access path that can be used as a replacement of a first access path that is currently in use to connect the data storage device and the host computer, wherein the second access path is selected in advance of a defect on the first access path;

calculating a quantity of traffic on the first access path which is associated with a device disposed on the first access path;

calculating a variation of the quantity of traffic on the second access path which is associated with a device disposed on the second access path taking the calculated quantity of traffic on the first access path into consideration;

determining whether the device on the second access path causes a bottleneck or not, according to the calculated value of the variation of traffic on the second access path; and outputting a determination result, wherein a value of the quantity of traffic on the first access path is reduced, and the reduced value is added to the quantity of traffic associated with the device on the second access path, to calculate the variation of the quantity of traffic in the respective devices on the second access path.

2. The method for managing an access path according to claim 1, wherein the first and second access paths include a plurality of ports of the data storage device, a plurality of adaptors of the host computer, and switches that switch over connection relationships between the ports and the adaptors, wherein information on identifiers indicative of those connection relationships is displayed on a display device in order to notify a manager of the information as path information of the bottleneck.

3. The method for managing an access path according to claim 1, wherein in the case where a plurality of second access paths exist with respect to the first access path, a value obtained by dividing the calculated value of the traffic quantity on the first access path by the number of second access paths is equally added in calculation of the variation of the traffic quantity in the respective devices on the second access path.

4. The method for managing an access path according to claim 1, wherein in the determination of the bottleneck, in the case where the calculated value of the variation of traffic is larger than 0, it is determined that there is a bottleneck.

5. The method for managing an access path according to claim 1, wherein the bottleneck is determined, with the calculated value of the variation in the traffic as an input, according to a user's defined function of a true-value representing whether there is a bottleneck or not.

6. The method for managing an access path according to claim 1, wherein a plurality of access paths for accessing at least one logical volume formed in the data storage device from the host computer are managed, and a traffic information table that stores the calculated quantity of traffic is prepared with respect to the device on the selected second access path and then stored in a storage device of a server that manages the access path.

7. The method for managing an access path according to claim 1, wherein an access path information table that stores information indicative of a host computer path adaptor of the host computer, a port of the data storage device, an identifier of the logical volume, and an application program stored in the logical volume, which exist on the access path, is stored in the storage device of the server that manages the access path in correspondence with an ID of the access path.

8. The method for managing an access path according to claim 7, wherein the determination result is notified to the application program registered in the table and the associated manager with reference to the access path information table.

9. A method for managing an access path in a storage network system that forms multiple paths between a large-capacity data storage device and a host computer that employs the data storage device, and transfers data by means of a selected path, the method comprising:

selecting a second access path that can be used as a replacement of a first access path that is currently in use to connect the data storage device and the host computer, wherein the second access path is selected in advance of a defect on the first access path;

calculating a quantity of traffic on the first access path which is associated with a device disposed on the first access path;

calculating a variation of the quantity of traffic on the second access path which is associated with a device disposed on the second access path taking the calculated quantity of traffic on the first access path into consideration;

determining whether the device on the second access path causes a bottleneck or not, according to the calculated value of the variation of traffic on the second access path; and outputting a determination result, wherein in the determination of the bottleneck, in the case where a ratio of the calculated value of the variation of traffic and the calculated value of the traffic before switching is larger than a given value, it is determined that there is a bottleneck.

10. A method for managing an access path in a storage network system that forms multiple paths between a large-capacity data storage device and a host computer that employs the data storage device, and transfers data by means of a selected path, the method comprising:

selecting a second access path that can be used as a replacement of a first access path that is currently in use to connect the data storage device and the host computer, wherein the second access path is selected in advance of a defect on the first access path;

calculating a quantity of traffic on the first access path which is associated with a device disposed on the first access path;

calculating a variation of the quantity of traffic on the second access path which is associated with a device disposed on the second access path taking the calculated quantity of traffic on the first access path into consideration;

determining whether the device on the second access path causes a bottleneck or not, according to the calculated value of the variation of traffic on the second access path; and outputting a determination result, wherein the determination of the bottleneck is conducted by comparing the calculated value of the traffic after switching which is a value obtained by adding the calculated value of the variation of the traffic to the calculated value of the traffic before switching with a value indicative of an allowable value of the traffic of the device on the second access path.

11. A method for managing an access path in a storage network system that forms multiple paths between a large-capacity data storage device and a host computer that employs the data storage device, and transfers data by means of a selected path, the method comprising:

selecting a second access path that can be used as a replacement of a first access path that connects the data storage device and the host computer;

calculating a quantity of traffic on the first access path which is associated with a device disposed on the first access path;

calculating a variation of the quantity of traffic on the second access path which is associated with a device disposed on the second access path taking the calculated quantity of traffic on the first access path into consideration;

determining whether the device on the second access path causes a bottleneck or not, according to the calculated value of the variation of traffic on the second access path;

outputting a determination result, wherein a value of the quantity of traffic on the first access path is reduced, and the reduced value is added to the quantity of traffic associated with the device on the second access path, to calculate the variation of the quantity of traffic in the respective devices on the second access path.

12. The method for managing an access path according to claim 11, wherein in the case where a plurality of second access paths exist with respect to the first access path, a value obtained by dividing the calculated value of the traffic quantity on the first access path by the number of second access paths is equally added in calculation of the variation of the traffic quantity in the respective devices on the second access path.

13. A method for managing an access path in a storage network system that forms multiple paths between a large-capacity data storage device and a host computer that employs the data storage device, and transfers data by means of a selected path, the method comprising:

selecting a second access path that can be used as a replacement of a first access path that connects the data storage device and the host computer;

calculating a quantity of traffic on the first access path which is associated with a device disposed on the first access path;

calculating a variation of the quantity of traffic on the second access path which is associated with a device disposed on the second access path taking the calculated quantity of traffic on the first access path into consideration;

determining whether the device on the second access path causes a bottleneck or not, according to the calculated value of the variation of traffic on the second access path;

outputting a determination result, wherein in the determination of the bottleneck, in the case where a ratio of the calculated value of the variation of traffic and the calculated value of the traffic before switching is larger than a given value, it is determined that there is a bottleneck.

14. A method for managing an access path in a storage network system that forms multiple paths between a large-capacity data storage device and a host computer that employs the data storage device, and transfers data by means of a selected path, the method comprising:

selecting a second access path that can be used as a replacement of a first access path that connects the data storage device and the host computer;

calculating a quantity of traffic on the first access path which is associated with a device disposed on the first access path;

calculating a variation of the quantity of traffic on the second access path which is associated with a device disposed on the second access path taking the calculated quantity of traffic on the first access path into consideration;

determining whether the device on the second access path causes a bottleneck or not, according to the calculated value of the variation of traffic on the second access path;

outputting a determination result, wherein the determination of the bottleneck is conducted by comparing the calculated value of the traffic after switching which is a value obtained by adding the calculated value of the variation of the traffic to the calculated value of the traffic before switching with a value indicative of an allowable value of the traffic of the device on the second access path.

\* \* \* \* \*